United States Patent
Milby (10) Patent No.: US 7,092,933 B1
(45) Date of Patent: Aug. 15, 2006

(54) SUPPORTING USER-DEFINED DATATYPES

(75) Inventor: Gregory H. Milby, San Marcus, CA (US)

(73) Assignee: NCR Corporation, Dayton, OH (US)

( * ) Notice: Subject to any disclaimer, the term of this patent is extended or adjusted under 35 U.S.C. 154(b) by 460 days.

(21) Appl. No.: 10/321,041

(22) Filed: Dec. 17, 2002

(51) Int. Cl.
G06F 17/30 (2006.01)
G06F 7/00 (2006.01)

(52) U.S. Cl. ............................. 707/2; 707/3; 707/103

(58) Field of Classification Search ............... 707/2, 707/102, 3, 103
See application file for complete search history.

(56) References Cited

U.S. PATENT DOCUMENTS

| | | | | |
|---|---|---|---|---|
| 6,069,627 | A * | 5/2000 | Conrad et al. | 715/866 |
| 6,338,056 | B1 * | 1/2002 | Dessloch et al. | 707/2 |
| 6,708,186 | B1 * | 3/2004 | Claborn et al. | 707/102 |
| 6,738,968 | B1 * | 5/2004 | Bosworth et al. | 717/157 |
| 6,976,029 | B1 * | 12/2005 | Venkatesh et al. | 707/102 |

OTHER PUBLICATIONS

C How to Program by H.M. Deitel/P.J. Deitel, Second Edition, Prentice Hall, 1994; pp. 597, and 694-695.*

* cited by examiner

*Primary Examiner*—Don Wong
*Assistant Examiner*—Thanh-Ha Dang
(74) *Attorney, Agent, or Firm*—Baker Botts (57) ABSTRACT

A method includes receiving a request associated with a user-defined datatype. The user-defined datatype includes at least one data element. The method also includes creating an instance of the datatype. In addition, the method includes storing the instance of the datatype in one column of a row in a database table, the column including at least one value associated with the at least one data element.

28 Claims, 8 Drawing Sheets

502 — TypeId type_id
508 — Unint Length
410
504 — Typeinfo type_info
506 — void*udt_updt

Generic Constructor :
510 — alias_type(Typeid *type_id,Typeinfo * aliasType)

DBS Integration Methods :
512a — fieldToClass (void *sourcefield, int sourcesize, int *result)
512b — classToField (void *targetfield, int targetsize, int *result)
512c — dupFromBaseType (Typeinfo * typeinfo)
512d — fieldSize()
512e — getValue(void *returnValue, unsigned int * length)
512f — setValue(void *newValue, unsigned int * newLength)
512g — myTypeinfo (Typeinfo * predefType)
512h — map()

FIG. 5B

418
522 — [LENGTH] FIELD
520 — VALUE
406b

FIG. 6C

SUPPORTING USER-DEFINED DATATYPES

BACKGROUND

Conventional database systems often store large amounts of information. The information is typically classified into different classes of information called datatypes. Conventional database systems are often programmed to support specific datatypes called "predefined" datatypes. Example predefined datatypes include integer values, floating point numbers, characters, and strings. A user of a database system may wish to define additional datatypes called "user-defined datatypes" that are not native to the database system.

SUMMARY

This disclosure provides an improved system and method for supporting user-defined datatypes.

In one aspect, a method includes receiving a request associated with a user-defined datatype. The user-defined datatype includes at least one data element. The method also includes creating an instance of the datatype. In addition, the method includes storing the instance of the datatype in one column of a row in a database table, the column including at least one value associated with the at least one data element.

In another aspect, a method includes receiving a request associated with a user-defined datatype. The user-defined datatype includes at least one data element. The method also includes determining whether a first instance associated with the datatype appears in a memory. The method further includes creating a constructor function and creating the first instance of the datatype using the constructor function when the first instance does not appear in the cache. In addition, the method includes generating a second instance using the first instance, the second instance comprising the at least one data element.

One or more technical features may be provided according to various embodiments of this disclosure. Particular embodiments of this disclosure may exhibit none, some, or all of the following features depending on the implementation. For example, in one example, a system for supporting user-defined datatypes is provided. In particular, the system allows a user to define a datatype having one or more data elements. Each data element could represent a predefined datatype, such as an integer or string, or another user-defined datatype. By allowing the user to define and create datatypes, this may give the user more control so the user may create more suitable datatypes for specific situations. Also, an instance of the user-defined datatype could be stored in a single column of a database table, even when the datatype includes multiple data elements. This may help to simplify storage of the instance of the user-defined datatype.

Other technical features may be readily apparent to one skilled in the art from the following figures, descriptions, and claims.

DETAILED DESCRIPTION

Figure 1:
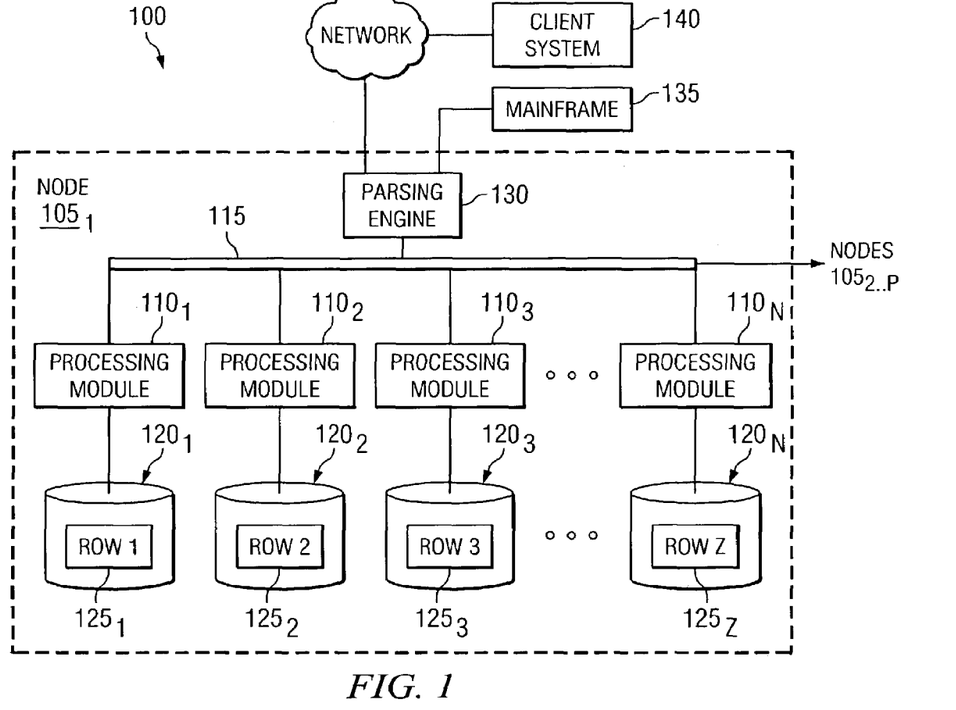
FIG. 1 is a block diagram of a node of a database system.

The datatype definition technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
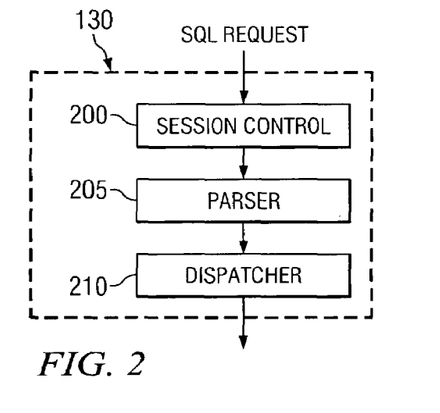
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
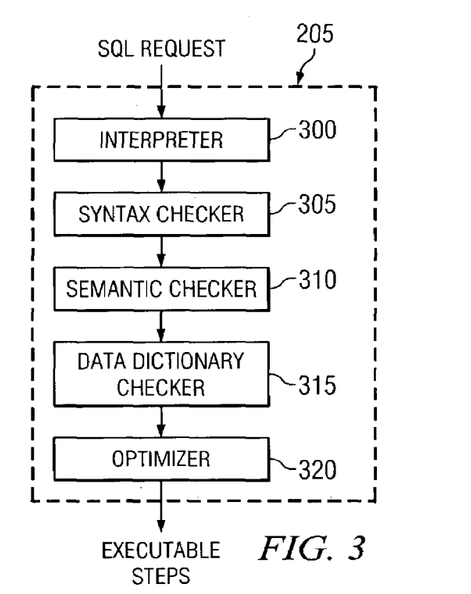
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
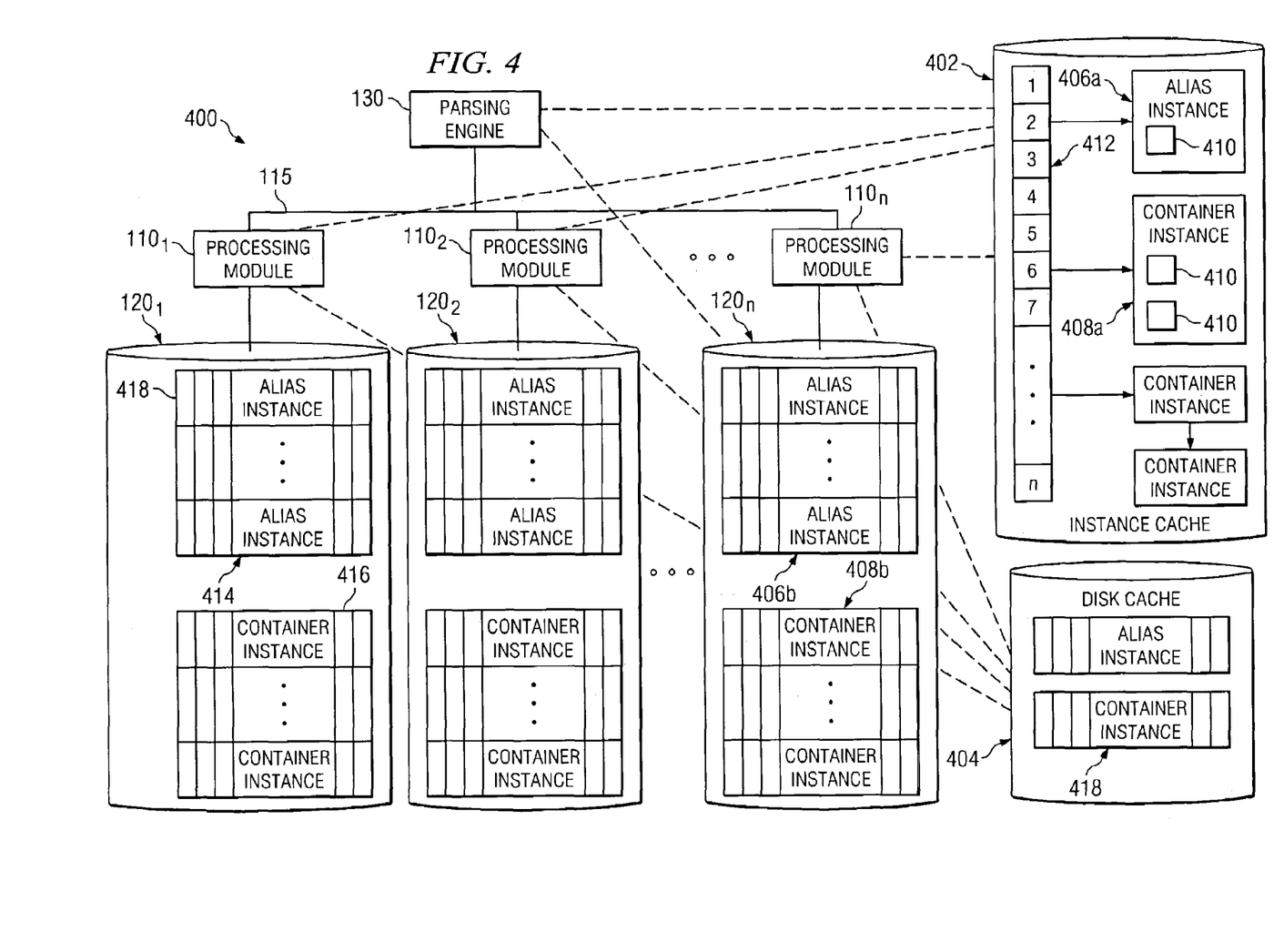
FIG. 4 is a block diagram of a memory arrangement for supporting user-defined datatypes.

A memory arrangement 400, illustrated in FIG. 4, supports the creation and use of user-defined datatypes in DBS 100. In this example, parsing engine 130 and/or processing modules 110 have access to an instance cache 402 and a disk cache 404. Caches 402, 404 represent any suitable memory or memories that can be used by parsing engine 130 and/or processing modules 110 to store and retrieve information. The following description describes processing modules 110 and parsing engine 130 performing particular functions to create and support the use of new datatypes in DBS 100. Functions described as being performed by processing modules 110 could also be performed by parsing engine 130 or any other suitable component of DBS 100. Similarly, functions described as being performed by parsing engine 130 could also be performed by processing modules 110 or any other suitable component of DBS 100. In this specification, the term "cache" refers to any suitable memory or memories operable to store and facilitate retrieval of information. As a particular example, a cache may represent a memory dedicated to a special purpose, such as a memory dedicated to storing a particular type of information.

In the illustrated example, instance cache 402 includes one or more datatype instances 406a, 408a. Instances 406a, 408a represent instances of user-defined datatypes that have been created by one or more users in DBS 100. A "datatype" represents a collection of one or more data elements 410, where each data element 410 has its own datatype and can be assigned or otherwise associated with a value consistent with the datatype of that data element 410. A datatype can be "predefined," where the definition of the datatype is native to or preprogrammed into DBS 100. Predefined datatypes could include integers, floating point numbers, strings, characters, or any other suitable datatype. A datatype can also be "user-defined," where the user specifies the data element or elements 410 that form the datatype. In this example, each instance 406a, 408a in cache 402 represents a user-defined datatype, where the data element or elements 410 in one user-defined instance 406a, 408a each represent a predefined datatype or another user-defined datatype.

Figure 5A:
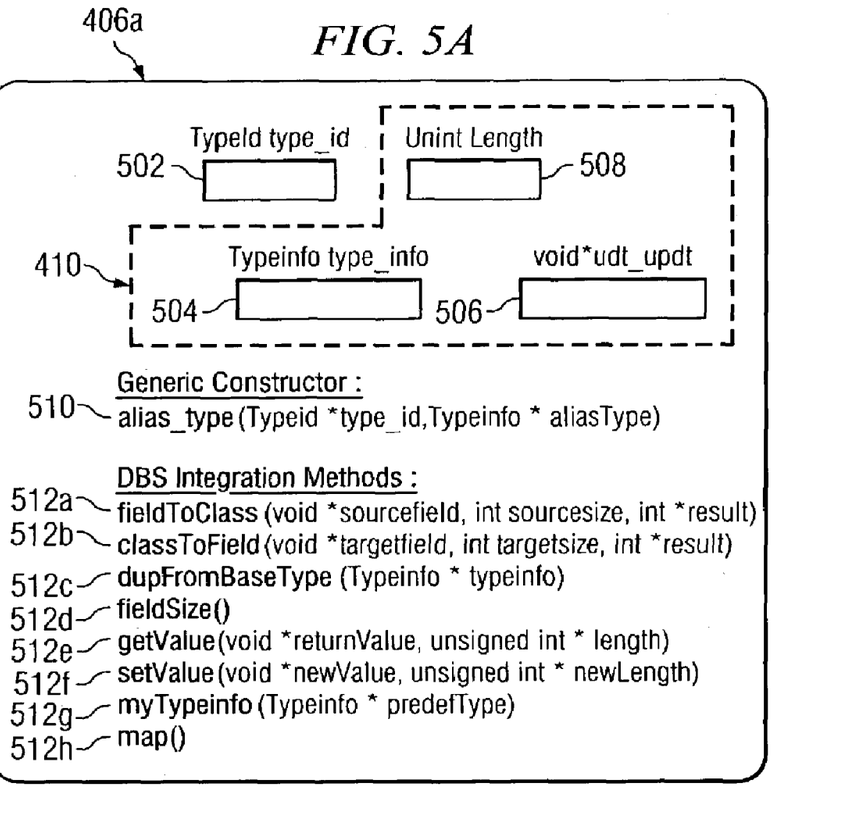
FIGS. 5A and 5B are block diagrams of a user-defined datatype.

As shown in FIG. 4, the user-defined datatypes may be subdivided into alias datatypes (associated with alias instances 406a) and container datatypes (associated with container instances 408a). An alias instance 406a represents a datatype defined by the user that includes one data element 410. The data element 410 in the alias instance 406a represents a predefined datatype in DBS 100. As particular examples, the data element 410 in the alias instance 406a may represent an integer, a floating point number, a string, or a character. In a particular system, the data element 410 in the alias instance 406a may not represent a user-defined datatype. An example alias instance 406a is shown in FIG. 5A, which is described below.

Figure 6A:
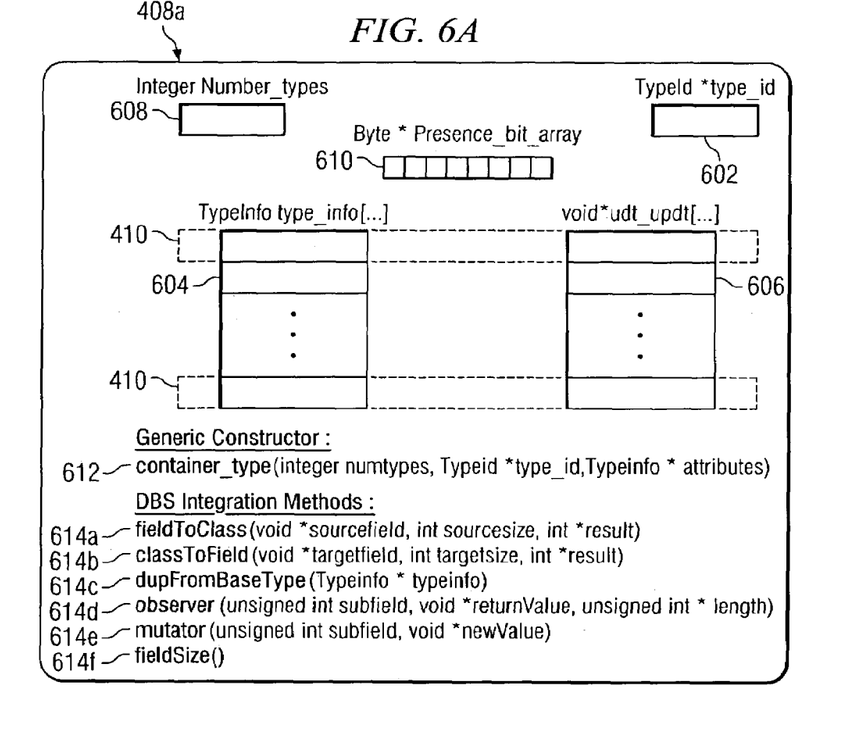
FIGS. 6A through 6C are block diagrams of another user-defined datatype.

A container instance 408a represents a datatype defined by the user that includes multiple data elements 410. Each data element 410 in the container instance 408a could represent a predefined datatype in DBS 100. Each data element 410 in the container instance 408a could also represent another user-defined datatype, such as an alias instance 406a or another container instance 408a. An example container instance 408a is shown in FIG. 6A, which is described below.

A user, such as a user using mainframe 135 or client 140, may submit a request to create a user-defined datatype to parsing engine 130. The request may, for example, identify the name of the user-defined datatype and the data element or elements 410 to be included in the user-defined datatype. Parsing engine 130 creates a first instance 406a, 408a of the new user-defined datatype and inserts the first instance 406a, 408a into instance cache 402. When a user attempts to use the user-defined datatype in DBS 100, a processing module 110 accesses instance cache 402 and identifies the first instance 406a, 408a associated with the user-defined datatype. Processing module 110 then generates a second instance of the user-defined datatype using the first instance 406a, 408a. For example, processing module 110 could duplicate the first instance 406a, 408a to create the second instance. After that, processing module 110 allows the user to use the second instance of the datatype, such as by allowing the user to assign values to the second instance. If additional users want to use the user-defined datatype or if the same user requires additional instances of the datatype, processing modules 110 access instance cache 402 and duplicate the first instance 406a, 408a again to create additional copies of instance 406a, 408a. Because the first instance 406a, 408a of a user-defined datatype is used to create additional instances of the user-defined datatype, the first instance 406a, 408a may be referred to as a "base copy" of the datatype.

In the illustrated example, instance cache 402 also includes an index 412. Index 412 provides a mechanism for identifying various instances 406a, 408a in instance cache 402. For example, index 412 may represent an array of pointers. When processing module 110 receives a request to create an instance of a user-defined datatype, processing module 110 may identify an identifier associated with the requested datatype. The identifier may, for example, represent an integer value i. Using the integer value i, processing module 110 accesses index 412 and identifies the pointer residing in the ith entry of index 412. Processing module 110 follows the pointer to an instance 406a, 408a associated with that entry. Because index 412 may represent an array of pointers, index 412 and instances 406a, 408a may collectively be referred to as an "instance array."

Figure 5B:
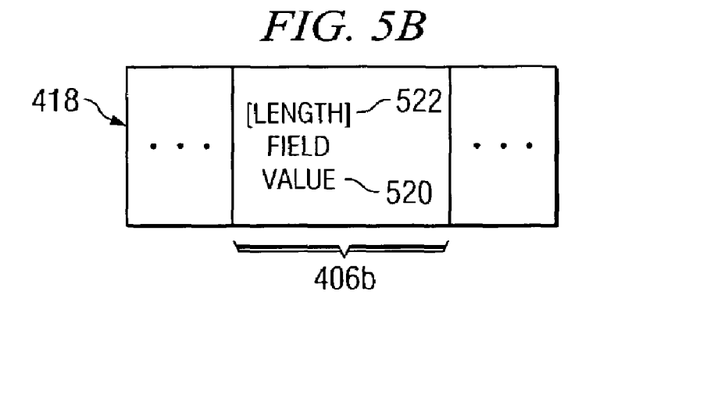
Figure 6B:
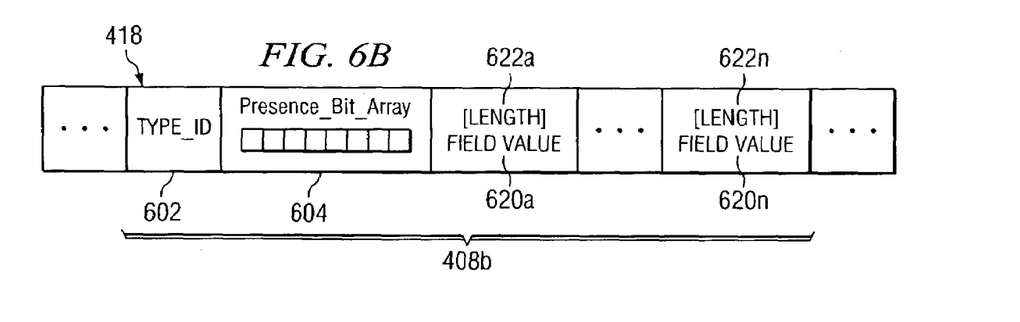

Once the second instance of a user-defined datatype is created, the user may assign values to the data element or elements 410 in the second instance. The user may also wish to store the second instance in a database table 414. In an example system, an instance 406a, 408a of a user-defined datatype is stored in a single column 416 of a row 418 in a database table 414, even when the instance 406a, 408a includes multiple data elements 410. In FIG. 4, an alias instance stored in a database table 414 is denoted as alias instance 406b, and a container instance stored in a database table 414 is denoted as container instance 408b. In this example, the format used by instances 406a, 408a may be referred to as an "in-memory format," and the format used by instances 406b, 408b may be referred to as an "in-table format." One example of an alias instance 406b is shown in FIG. 5B, which is described below. One example of a container instance 408b is shown in FIG. 6B, which is also described below. In a particular system, processing module 110 stores an instance 406a, 408a of a user-defined datatype in a column 416 of a row 418 by serially storing values of the data elements 410 in the column 416. In this way, processing module 110 converts an instance from the in-memory format to the in-table format.

In an example system, an instance 406a, 408a in instance cache 402 may be removed from instance cache 402. As a particular example, an instance 406a, 408a may be removed from instance cache 402 when the instance 406a, 408a has not been used for a specified length of time, such as one hour. When node 105 determines that the instance 406a, 408a has not been used for the specified length of time, node 105 may age the instance 406a, 408a. Aging the instance 406a, 408a makes the memory space occupied by that instance 406a, 408a available for use in storing other information.

To facilitate the storage of information in data storage facilities 120, disk cache 404 stores multiple rows 418 to be written to one or more database tables 414. In this example, when a row 418 is being added to a database table 414, the row 418 is first written to disk cache 404. At any suitable time, such as when a specified amount of time elapses, one or more rows 418 from disk cache 404 may be sent to a processing module 110. Processing module 110 may then update one or more database tables 414 using the received rows 418. In a particular system, a processing module 110 may receive multiple rows 418 from disk cache 404, where the rows 418 involve the same database table 414. In this system, processing module 110 may store multiple rows 418 in the database table 414 during a single write operation, such as by block copying the rows 418 into the table 414. This may help to facilitate more efficient and quicker storage of information in database tables 414.

Although FIG. 4 illustrates one example of a memory arrangement 400 for supporting user-defined datatypes, various changes may be made to memory arrangement 400. For example, any number of instances 406a, 408a could be contained in instance cache 402. Also, each row 418 in a database table 414 may include any number of alias instances 406b and/or any number of container instances 408b, and not all database tables 414 need to include instances 406b, 408b. Further, while FIG. 4 illustrates the use of both alias instances 406 and container instances 408, DBS 100 could support only one of the two user-defined datatypes. In addition, while two caches 402, 404 are shown in FIG. 4, the information in caches 402, 404 could also be combined into a single memory or subdivided into more than two caches.

An alias instance 406a, illustrated in FIG. 5A, includes a type identifier 502. Identifier 502 identifies the user-defined datatype associated with instance 406a. In an example system, all instances 406a associated with a user-defined datatype have the same identifier 502. In a particular system, each user-defined datatype has a unique identifier 502, so the identifier 502 associated with one user-defined datatype is different from the identifiers 502 associated with other user-defined datatypes. The identifier 502 of a user-defined datatype could also represent an entry in index 412 that points to an instance of the user-defined datatype. For example, if the identifier 502 for a user-defined datatype has a value of seventeen, the seventeenth entry of index 412 could point to an instance of the user-defined datatype.

As described above, an alias instance 406a is associated with one data element 410, where the data element 410 represents a predefined datatype in DBS 100. In this example, the data element 410 is represented by a data element identifier 504, a pointer 506, and a length 508. Data element identifier 504 identifies the predefined datatype associated with the data element 410. Data element identifier 504 may also identify any parameters defining the data element 410, such as the number of decimal places supported by a floating point data element 410.

Pointer 506 identifies whether or not a value has been assigned to the data element 410. For example, pointer 506 may represent a null pointer, which indicates that no value is associated with the data element 410. If a value has been assigned to the data element 410, point 506 identifies the location of the value. By following the pointer 506, processing module 110 could identify the value assigned to the data element 410.

Length 508 represents the length of the value assigned to the data element 410. In an example system, the value identified by pointer 506 may have a variable length. This may occur, for example, when pointer 506 points to a string, and the string could include any number of characters up to a maximum length. In this embodiment, length 508 identifies the actual length of the value currently assigned to the data element 410. If the length of the value changes, the length 508 in instance 406a can be updated.

In the illustrated example, a user-defined alias datatype is associated with a constructor function 510 and one or more integration functions 512. Constructor function 510 allows parsing engine 130 to create instance 406a. In an example system, a user may request the creation of a new alias datatype, and parsing engine 130 receives information identifying the data element 410 to be included in the new datatype. Parsing engine 130 then generates constructor function 510. When a user first requests use of the new alias datatype, parsing engine 130 uses the constructor function 510 to generate an instance 406a of the new datatype. The new instance 406a is stored in instance cache 402 and is used by parsing engine 130 to create future instances of the alias datatype.

Integration functions 512 are used by processing modules 110 to perform different functions involving the instance 406a. For example, a field to class function 512a converts an instance 406b (in-table format) into an instance 406a (in-memory format). A class to field function 512b converts an instance 406a (in-memory format) into an instance 408b (in-table format). Functions 512a and 512b may be used to allow information associated with an instance 406a to be stored in and retrieved from a persistent memory, such as data storage facility 120.

A duplication function 512c generates a duplicate copy of instance 406a. Duplication function 512c may be used, for example, by processing module 110 when a user requests a new instance of the alias datatype. In response to the request, processing module 110 accesses instance cache 402 and identifies the desired alias instance 406a in the instance cache 402. Processing module 110 then uses the duplication function 512c to create a copy of the identified instance 406a, and the copy is available for use by the user. A field size function 512d returns the length 508 of the value of identified by pointer 506. A get value function 512e returns the value identified by pointer 506. A set value function 512f assigns a new value to the data element 410.

A type information function 512g returns information identifying the predefined datatype associated with instance 406a. For example, the type information function 512g could return the data element identifier 504 of instance 406a. This allows a processing module 110 or parsing engine 130 to identify whether the data element 410 is an integer, floating point number, string, or character. A map function 512h returns pointer 506 and another pointer to length 508. This allows processing module 110 or parsing engine 130 to identify the value assigned to the data element 410.

The instance 406a in FIG. 5A represents the in-memory format of a user-defined alias datatype instance. The in-table format of the user-defined alias datatype instance is shown in FIG. 5B. In FIG. 5B, instance 406b represents a single column 416 of a row 418 in a database table 414. In this example, instance 406b includes a field value 520. Field value 520 represents the value identified by pointer 506 in the corresponding instance 406a. Instance 406b may also include a length 522. Length 522 identifies the length of the field value 520 in instance 406b. Length 522 may equal length 508 from the corresponding instance 406a. In an example system, length 522 may be optional in instance 406b. For example, length 522 may be used when value 520 could have a variable length, such as when value 520 represents a string. When value 520 cannot have a variable length, such as when value 520 represents an integer, length 522 may not be needed.

Although FIGS. 5A and 5B illustrate example alias instances 406a, 406b, various changes may be made to FIGS. 5A and 5B. For example, the contents of instances 406a, 406b are for illustration only. Instances 406a, 406b could include other or additional information without departing from the scope of this disclosure. As a particular example, while FIG. 5A illustrates instance 406a as including a pointer 506 to a value, instance 406a could also include the value itself.

A container instance 408a, illustrated in FIG. 6A, includes a type identifier 602, which uniquely identifies the user-defined datatype associated with instance 408a. As described above, container instance 408a includes multiple data elements 410. Each data element 410 is associated with a data element identifier 604 and a pointer 606. Each data element identifier 604 identifies the datatype associated with a data element 410. The datatype identified by data element identifier 604 could include a predefined datatype, such as an integer, floating point number, string, or character. The datatype identified by data element identifier 604 could also represent an alias datatype or other container datatype. Pointer 606 identifies whether or not a value has been assigned to one of the data elements 410. Each pointer 606 could identify a value or contain a null value.

A number of elements value 608 identifies the number of data elements 410 contained in the instance 408a. A presence bit array 610 identifies whether each data element 410 contained in instance 408a has been assigned a value. For example, if a pointer 606 associated with a data element 410 has a null value, a corresponding flag in presence bit array 610 may have a value of zero. If the pointer 606 associated with a data element 410 identifies a value, the corresponding flag in presence bit array 610 may have a value of one. As described below, processing module 110 may use presence bit array 610 to store instance 408a in a database table 414.

In the illustrated example, a user-defined container datatype is associated with a constructor function 612 and one or more integration functions 614. Constructor function 612 allows parsing engine 130 to generate an instance 408a, which parsing engine 130 then stores in instance cache 402. Integration functions 614 are used by parsing engine 130 to perform different functions involving the instance 408a. A field to class function 614a converts an instance 408b (in-table format) into an instance 408a (in-memory format). A class to field function 614b converts an instance 408a (in-memory format) into an instance 408b (in-table format). A duplication function 614c generates a duplicate copy of instance 408a, and the duplicate can be used by a user.

An observer function 614d returns the value of one of the data elements 410 in container instance 408a, such as by returning the value identified by the pointer 606 associated with the data element 410. A mutator function 614e assigns a new value to one of the data elements 410 in container instance 408a, such as by changing the value identified by the pointer 606 associated with the data element 410. A field size function 614f returns the length of the value assigned to one of the data elements 510 in container instance 408a.

The instance 408a in FIG. 6A represents the in-memory format of a user-defined container datatype instance. The in-table format of the user-defined datatype container instance is shown in FIG. 6B. In FIG. 6B, instance 408b represents a single column of a row 418 in a database table 414. In this example, instance 408b includes the instance identifier 602 and the presence bit array 610 from instance 408a.

Instance 408b also includes zero or more field values 620a–620n. Each field value 620 represents the value assigned to a data element 410 in instance 408a. In an example system, values identified by pointers 606 in instance 408a are stored serially in row 418. In a particular system, each pointer 606 in instance 408a may either identify a value or contain a null value. In this system, when a pointer 606 in instance 408a identifies a value, that value is inserted into instance 408b as a field value 620. When a pointer 606 in instance 408a contains a null value, no field value 620 is placed in instance 408b. In this way, instance 408b only contains values that are actually assigned to data elements 410 in instance 408a, without requiring that space be consumed storing null values. In one system, a flag in presence bit array 610 is associated with each data element 410 in instance 408a, and the flag identifies whether or not a field value 620 exists in row 418 for the data element 410 corresponding to that flag. Processing module 110 uses the flags in presence bit array 610 to convert an instance 408b to an instance 408a. For example, processing module 110 could examine a flag in presence bit array 610. If the flag indicates that no field value 620 exists in row 418, processing module 110 could store a null value in the corresponding pointer 606 in instance 408a. Otherwise, if the flag indicates that a field value 620 exists in row 418, processing module 110 could store a pointer to that value in the corresponding pointer 606 in instance 408a.

Each field value 620 may have a corresponding length 622. Length 622 identifies the length of the corresponding field value 620. The use of length 622 may be optional. For example, if field value 620 cannot have a variable length, length 622 may be omitted from instance 408b.

Figure 6C:
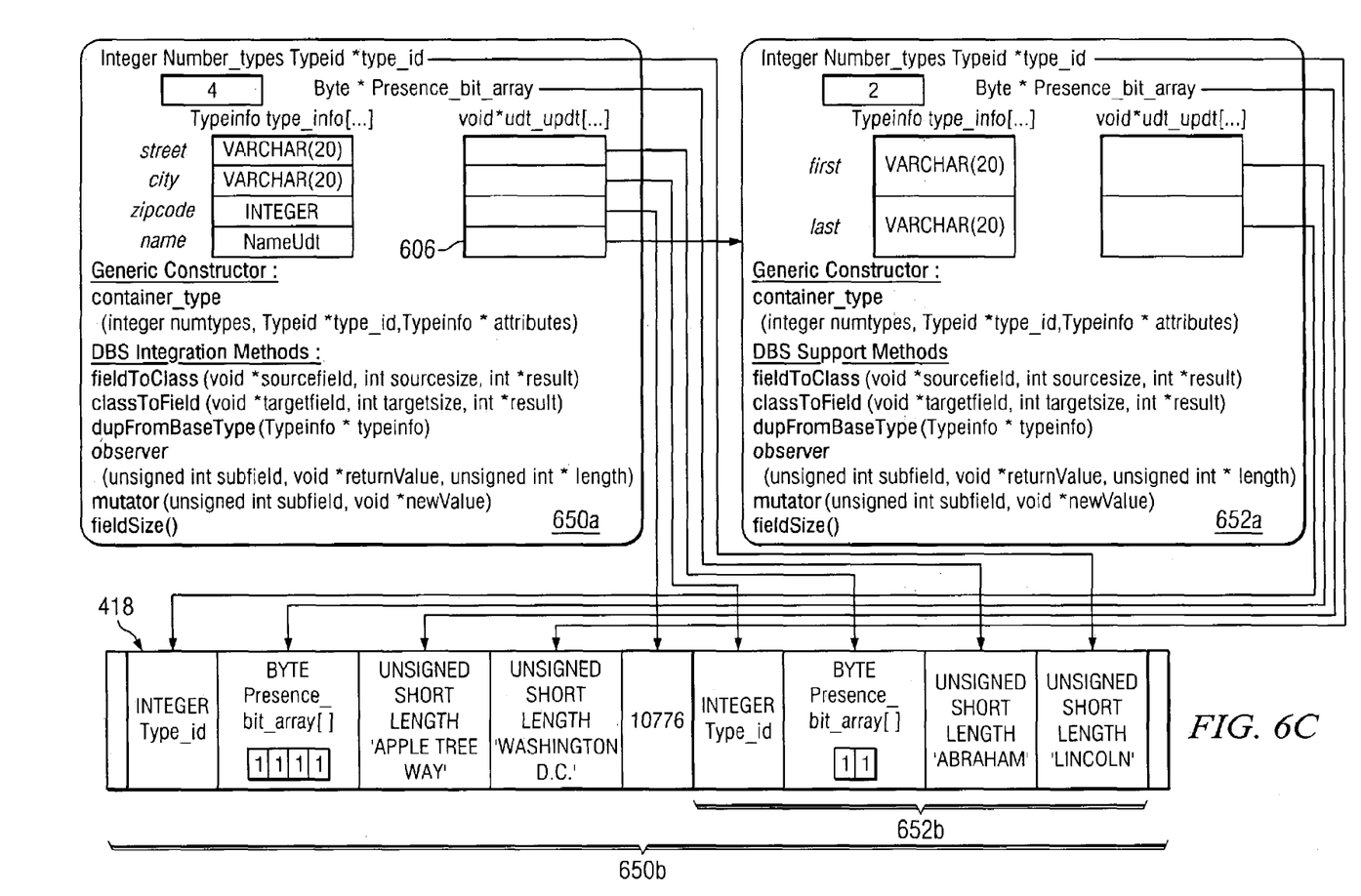

FIG. 6C shows a specific example of a situation where a first container instance 650a includes a pointer 606 identifying a second container instance 652a. In this example, instance 650a identifies information related to a person's address, while instance 652a identifies the name of the person.

As shown in FIG. 6C, values from instance 650a are stored serially in a row 418 (denoted as instance 650b). When one instance 650a identifies another instance 652a, the values from the other instance 652a are also inserted serially into the row 418 (denoted as instance 652b). In this way, parsing engine 130 can embed the contents of one instance into the contents of another instance in a row 418.

Although FIGS. 6A through 6C illustrate example container instances 408, 650, 652, various changes may be made to FIGS. 6A through 6C. For example, the contents of instances 408a, 408b are for illustration only. Instances 408a, 408b could include other or additional information without departing from the scope of this disclosure. As a particular example, while FIG. 6A illustrates instance 408a as including pointers 606 to values, instance 408a could also include the values themselves.

Figure 7:
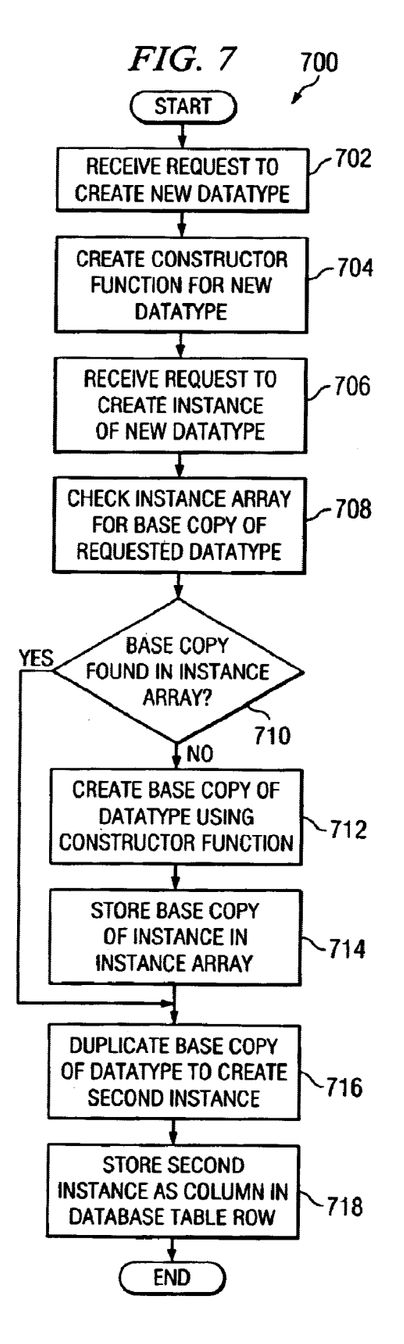
FIG. 7 is a flowchart of a method for supporting user-defined datatypes.

FIG. 7 is a flowchart of a method 700 for supporting user-defined datatypes. While method 700 may be described with respect to parsing engine 130 of DBS 100 of FIG. 1, method 700 could be used by other components of DBS 100 or in other systems.

DBS 100 receives a request to create a new datatype at block 702. This may include, for example, parsing engine 130 receiving a request to create a new alias datatype or a new container datatype from a mainframe 135 or client 140. As a particular example, a request to create an alias datatype could take the form:

CREATE TYPE name AS datatype where name represents a name assigned to the alias datatype, and datatype represents the datatype of the data element 410 associated with the datatype. As another particular example, a request to create a container datatype could take the form:

CREATE TYPE name AS (data_element datatype . . . data_element datatype)

where name represents a name assigned to the container datatype, data_element represents a name assigned to a data element 410 in the datatype, and datatype represents the datatype of a data element 410.

DBS 100 creates a constructor function for the new datatype at block 704. One example of a method for creating a constructor function in shown in FIG. 8, which is described below. DBS 100 receives a request to create an instance of the new datatype at block 706. This may include, for example, parsing engine 130 receiving a request to create the instance of the datatype from a mainframe 135 or client 140. As a particular example, a request to create an instance of a user-defined datatype could take the form of a GetInstance( ) function call, where the function call identifies the user-defined datatype and attempts to return a pointer to a new instance of the datatype.

DBS 100 checks an instance array for a base copy of the requested datatype at block 708. This may include, for example, parsing engine 130 accessing index 412 using the type identifier 502, 602 associated with the requested datatype. This may also include parsing engine 130 accessing the entry in index 412 associated with the requested datatype. DBS 100 determines whether the instance array contains the base copy of the requested datatype at block 710. This may include, for example, parsing engine 130 determining whether the entry in index 412 contains a null value or points to an instance 406a, 408a. If the entry points to a null value, the instance array does not contain a base copy of the requested datatype, and DBS 100 creates the base copy of the requested datatype at block 712. This may include, for example, parsing engine 130 creating the base copy using the constructor function 510, 612 generated at block 704. DBS 100 also stores the newly-created base copy of the requested datatype in the instance array at block 714. This may include, for example, parsing engine 130 storing the base copy in cache 402 and setting an entry in index 412 to point to the base copy.

DBS 100 duplicates the base copy of the requested datatype to create another instance of the requested datatype at block 716. This may include, for example, parsing engine 130 invoking the duplication function 512c, 614c of the instance 406a, 408a to create a second instance of the requested datatype. The user requesting the instance of the user-defined datatype may then use the second instance, such as by storing values in the second instance.

DBS 100 stores the second instance of the requested datatype as a column 416 in a row 418 of a database table 414 at block 718. This may include, for example, parsing engine 130 serially storing values of the data element or elements 410 from the second instance in the row 718. If the second instance contains a data element 410 that represents an alias or container instance, this may also include parsing engine 130 serially storing values from the alias or container instance in the row 418. This may further include parsing engine 130 storing the row 418 in a disk cache 404 or data storage facility 120.

Although FIG. 7 illustrates one example of a method 700 for supporting user-defined datatypes, various changes may be made to FIG. 7. For example, FIG. 7 shows DBS 100 creating and storing the base copy of the new datatype at blocks 712–714 after receiving a request to create an instance of the new datatype at block 706. DBS 100 could also create and store the base copy of the new datatype before the request to create the instance is received at block 706.

Figure 8:
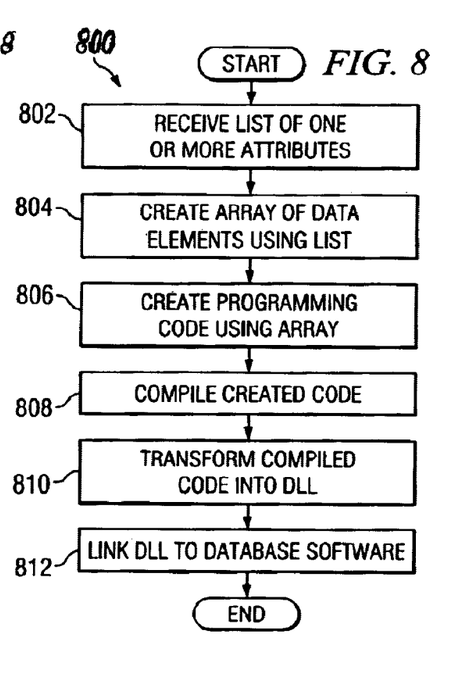
FIG. 8 is a flowchart of a method for generating a constructor for a user-defined datatype.

FIG. 8 is a flowchart of a method 800 for generating a constructor for a user-defined datatype. While method 800 may be described with respect to parsing engine 130 of DBS 100 of FIG. 1, method 800 could be used by other components of DBS 100 or in other systems.

DBS 100 receives a list identifying one or more attributes at block 802. An attribute could represent the datatype to be used to create an alias datatype. An attribute could also represent one of the datatypes to be used to create a container datatype. DBS 100 creates an array of one or more data elements using the list at block 804. This may include, for example, parsing engine 130 generating a list of one or more data elements 410 having the same datatype or datatypes received at block 802.

DBS 100 creates programming code using the array of data elements at block 806. This may include, for example, C or C++ code being created, where the code defines a data structure. The structure includes definitions for the one or more data elements 410 identified at block 804. As a particular example, given the command:

CREATE TYPE circle AS (X: integer, Y: integer, Radius: integer)

DBS 100 could generate the code:

```
circle( )
{
        return NEW container_type(3, 66, typeInfo)
}.
```

This code is operable when executed to invoke the container_type constructor function associated with the container datatype. The first parameter "3" represents the number of data elements contained in the container datatype (X, Y, and Radius). The second parameter "66" represents the type identifier associated with the container datatype. The typeInfo parameter represents a pointer that points to the array of data elements created at block 804. As another particular example, given the command:

CREATE TYPE dollar AS DECIMAL (8,2),\

DBS 100 could generate the code:

```
dollar( )
{
            return NEW alias_type(88, typeInfo)
}
```

This code is operable when executed to invoke the alias_type constructor function associated with the alias datatype. The first parameter "88" represents the type identifier associated with the alias datatype. The typeInfo parameter represents a pointer that points to the array of data elements created at block 804, where the array identifies a decimal data element.

The created programming code is compiled at block 808. This may include, for example, the programming code being compiled using a C or C++ compiler. DBS 100 transforms the compiled code into a dynamic link library (DLL) at block 810. DBS 100 links the dynamic link library to database software being executed by DBS 100 at block 812. This may include, for example, the dynamic link library being linked to the software executed by node 105. At this point, instances of the new user-defined datatype can be created and used in DBS 100.

Although FIG. 8 illustrates one example of a method 800 for generating a constructor for a user-defined datatype, various changes may be made to FIG. 8. For example, DBS 100 may generate programming code in any suitable language. Also, other mechanisms for incorporating the new programming code into DBS 100 could be used in place of the dynamic link library.

Figure 9:
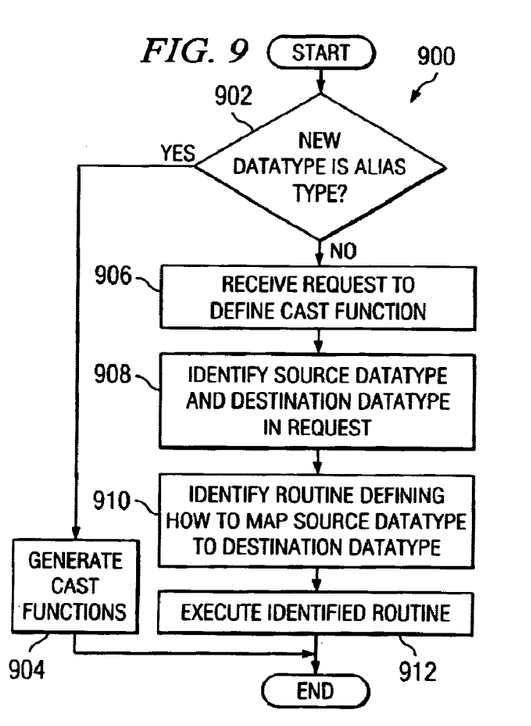
FIG. 9 is a flowchart of a method for generating one or more cast functions for a user-defined datatype.

FIG. 9 is a flowchart of a method 900 for generating one or more cast functions for a user-defined datatype. While method 900 may be described with respect to parsing engine 130 of DBS 100 of FIG. 1, method 900 could be used by other components of DBS 100 or in other systems.

A cast function casts an instance of one datatype as an instance of another datatype. It represents a routine or other mechanism specifying how DBS 100 may cast the instance from one datatype to another. As a particular example, given the command:

CAST(50.00 AS Dollar)

node 105 would cast the value "50.00" (decimal datatype) as a dollar value (dollar datatype).

In FIG. 9, DBS 100 determines whether a new datatype is an alias datatype at block 902. This may include, for example, parsing engine 130 examining a CREATE command to determine whether the new datatype is an alias datatype or a container datatype.

If the new user-defined datatype is an alias datatype, DBS 100 automatically generates one or more cast functions at block 904. In an example system, the alias datatype contains one data element 410, and the data element 410 represents a predefined datatype. In this example, DBS 100 may generate a first cast function that can retrieve the value associated with the data element 410 from an instance 406a of the alias datatype. In effect, this maps the instance 406a of the alias datatype as an instance of the predefined datatype. As a particular example, if an alias datatype instance contains an integer data element 410, the first cast function returns the integer value, in effect casting the alias datatype instance as an integer datatype. DBS 100 could also generate a second cast function that can assign a value to the data element 410 in an instance 406a of the alias datatype. This maps the value, having a predefined datatype, as an instance 406a of the alias datatype. In an example system, a database table 414 in DBS 100 may store information identifying the mapping between the alias datatype and the predefined datatype. In a particular example, the cast function generated here represents an entry in a database table 414, where the entry contains a mapping between the alias datatype and the predefined datatype. If a user later attempts to cast an instance from one of the datatypes to the other, DBS 100 may access the table 414 and determine if the casting is allowable.

If the new user-defined datatype is a container datatype, DBS 100 receives a request to define a cast function at block 906. This may include, for example, a request being submitted by the user of mainframe 135 or client 140. DBS 100 identifies a source datatype and a destination datatype using the request at block 908. The cast function to be generated by DBS 100 will cast an instance of the source datatype as an instance of the destination datatype. DBS 100 also identifies a routine defining how to map data elements 410 from the source datatype to data elements 410 in the destination datatype at block 910. The source datatype, destination datatype, and routine could be included as parameters in the request to create the cast function received at block 906. DBS 100 executes the identified routine at block 912. This may include, for example, DBS 100 executing the routine to identify mappings between the data elements 410 of the source datatype and the data elements 410 of the destination datatype. In an example system, a database table 414 in DBS 100 may store information identifying the mappings between the data elements 410 of the different datatypes. If a user later attempts to cast one datatype as another datatype, DBS 100 may check the database table 414 to determine whether the casting is allowable.

Although FIG. 9 illustrates one example of a method 900 for generating one or more cast functions for a user-defined datatype, various changes may be made to FIG. 9. For example, DBS 100 could allow the user to specify the routine to use when generating a cast function for an alias datatype.

Figure 10:
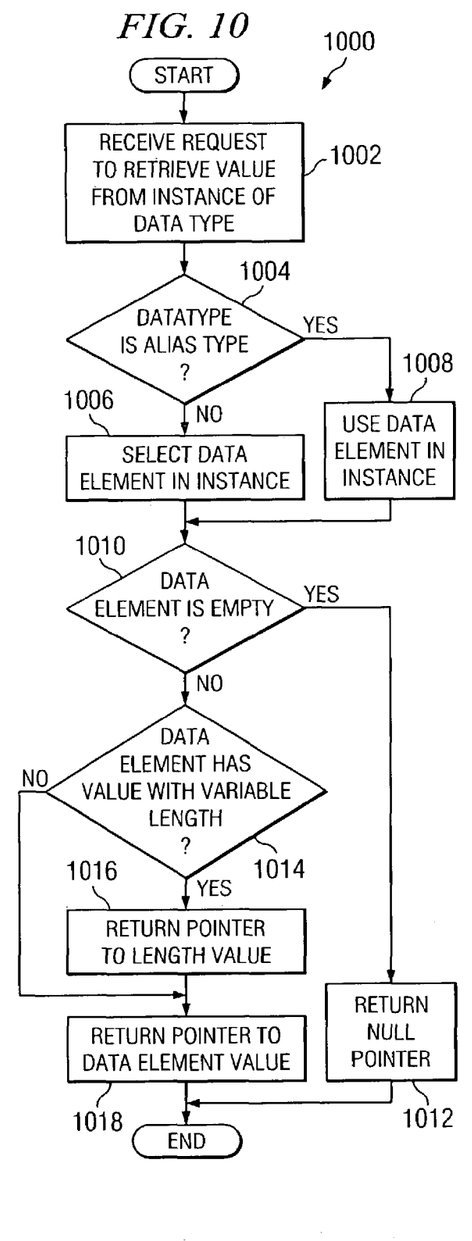
FIG. 10 is a flowchart of a method for retrieving a value from a user-defined datatype.

FIG. 10 is a flowchart of a method 1000 for retrieving a value from a user-defined datatype. While method 1000 may be described with respect to parsing engine 130 of DBS 100 of FIG. 1, method 1000 could be used by other components of DBS 100 or in other systems.

DBS 100 receives a request to retrieve a value from an instance of a user-defined datatype at block 1002. This may include, for example, parsing engine 130 receiving a SELECT command. DBS 100 determines whether the instance is an alias datatype instance at block 1004. If not, the instance represents a container datatype instance, and DBS 100 selects one of the data elements 410 in the instance at block 1006. This may include, for example, DBS 100 using the command received at block 1002 to identify the data element 410 to be retrieved. As a particular example, the SELECT command may identify one or more constraints, and the constraints specify or otherwise identify the data element 410 to be retrieved. Otherwise, if the instance is an alias datatype instance, the instance includes only one data element 410, and DBS 100 may use that data element 410 as the selected data element 410 at block 1008.

DBS 100 determines whether the selected data element is empty at block 1010. If the instance is an alias datatype instance, this may include determining whether the pointer 506 in the instance is a null pointer. If the instance is a container datatype instance, this may include determining whether the pointer 606 for the selected data element 410 is a null pointer or whether the flag in the presence bit array 610 associated with the selected data element 410 indicates that the selected data element 410 is empty.

If the selected data element is empty, DBS 100 returns a null pointer or other suitable indicator at block 1012. This may include, for example, parsing engine 130 returning a null pointer to the user at mainframe 135 or client 140. Otherwise, the selected data element is not empty, and DBS 100 determines whether the value associated with the selected data element 410 has a variable length at block 1014. If the data element has a variable length, DBS 100 returns a pointer to the length at block 1016. DBS 100 also returns a pointer to the value associated with the selected data element at block 1018. This may include, for example, returning one or both pointers to the user at mainframe 135 or client 140. This may also include using the pointers to return the actual value of the data element 410 to the user.

Although FIG. 10 illustrates one example of a method 1000 for retrieving a value from a user-defined datatype, various changes may be made to FIG. 10. For example, in another system, the length of a data element value could always be included in an instance of the datatype, and DBS 100 need not determine whether the data element has a variable length at block 1014. Also, while FIG. 10 illustrates retrieving a value from one instance, the same or similar procedure can be used to retrieve values from multiple instances or to retrieve multiple values.

Figure 11:
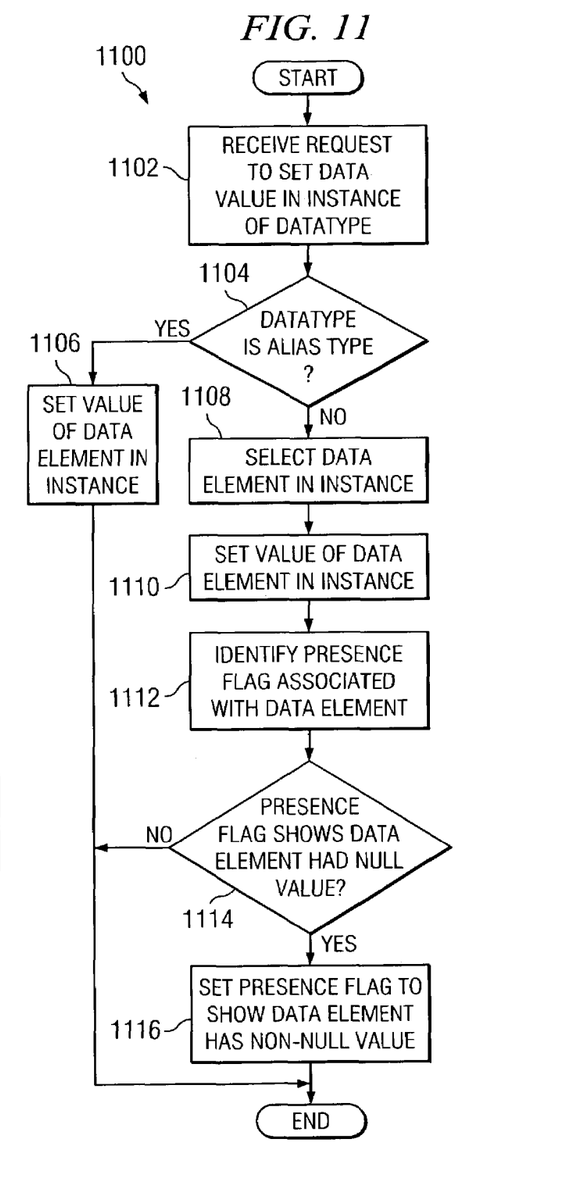
FIG. 11 is a flowchart of a method for assigning a value to a user-defined datatype.

FIG. 11 is a flowchart of a method 1100 for assigning a value to a user-defined datatype. While method 1100 may be described with respect to parsing engine 130 of DBS 100 of FIG. 1, method 1100 could be used by other components of DBS 100 or in other systems.

DBS 100 receives a request to assign a value to an instance of a user-defined datatype at block 1102. This may include, for example, parsing engine 130 receiving an UPDATE command. DBS 100 determines whether the instance is an alias datatype instance at block 1104. If so, DBS 100 assigns the value to the data element 410 in the alias instance at block 1106. This may include, for example, DBS 100 updating the value identified by the pointer 506 in the alias instance. If the value has a variable length, this may also include DBS 100 inserting the length of the value into the instance as length 508.

Otherwise, the instance is a container instance, and DBS 100 selects one of the data elements 410 in the instance at block 1108. This may include, for example, DBS 100 using the command received at block 1102 to identify the data element 410 in the instance. DBS 100 assigns the value to the selected data element 410 in the instance at block 1110. DBS 100 identifies a flag in the presence bit array 610 of the instance at block 1112. This may include, for example, identifying the flag in the presence bit array 610 that is associated with the selected data element 410. DBS 100 determines whether the identified presence flag shows that the selected data element 410 has a null value at block 1114. This may include, for example, determining whether the identified flag in presence bit array 610 has a value of zero. If not, method 1100 ends, and DBS 100 need not take any additional steps to assign a value to a data element 410 in an instance. Otherwise, DBS 100 sets the identified flag in presence bit array 610 to indicate that the selected data element 410 is no longer associated with a null value at block 1116. This may include, for example, setting the identified flag in presence bit array 610 to a value of one.

Although FIG. 11 illustrates one example of a method 1100 for assigning a value to a user-defined datatype, various changes may be made to FIG. 11. For example, while FIG. 11 illustrates assigning a value to one instance, the same or similar procedure can be used to assign a value to multiple instances or to assign multiple values to one or more instances.

Figure 12:
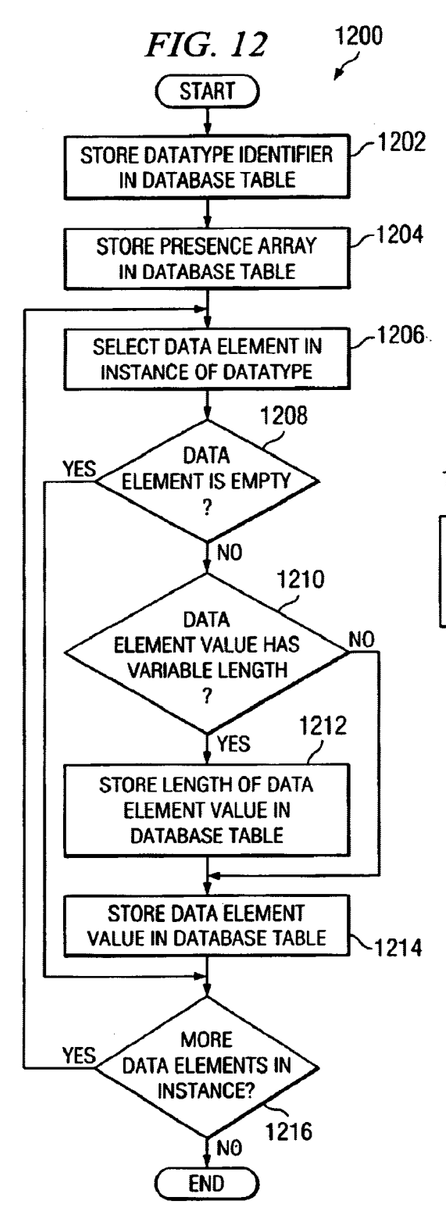
FIG. 12 is a flowchart of a method for storing an instance of a user-defined datatype in a database table.

FIG. 12 is a flowchart of a method 1200 for storing an instance of a user-defined datatype in a database table. In particular, method 1200 stores a container datatype instance 408*a* in a database table 414. While method 1200 may be described with respect to parsing engine 130 of DBS 100 of FIG. 1, method 1200 could be used by other components of DBS 100 or in other systems.

DBS 100 stores a datatype identifier in a database table at block 1202. This may include, for example, storing a type identifier 602 in a column 416 of a row 418 in table 414. DBS 100 stores a presence bit array in the database table at block 1204. This may include, for example, storing the presence bit array 610 in the same column 416 of the row 418 in table 414.

DBS 100 selects the first data element in the instance being stored at block 1206. This may include, for example, selecting the first flag in presence bit array 610 or the first data element 410 of the instance 408*a*. DBS 100 determines whether the selected data element is empty at block 1208. This may include, for example, determining whether the selected flag has a value of zero or whether the pointer 606 associated with the selected data element 410 has a null value. If empty, DBS 100 skips to block 1216 to determine whether there are additional data elements 410 in instance 408*a* to process.

Otherwise, if the data element is not empty, DBS 100 determines whether the value associated with the selected data element 410 has a variable length at block 1210. If so, DBS 100 stores the length of the value associated with the selected data element 410 in the database table at block 1212. This may include, for example, storing a length 622 in the column 416 previously used to store the type identifier 602 and presence bit array 610. DBS 100 stores the value associated with the selected data element 410 at block 1214. This may include, for example, storing the value as a field value 620 in the column 416 previously used to store the type identifier 602 and presence bit array 610. DBS 100 then determines whether additional data elements 410 remain to be processed in the instance 408*a*. If so, DBS 100 returns to block 1206 to process and store the next data element 410. If not, DBS 100 has stored the instance 408*a* as a column 416 in the database table 414.

Although FIG. 12 illustrates one example of a method 1200 for storing an instance of a user-defined datatype in a database table, various changes may be made to FIG. 12. For example, to store an instance 406*a* of an alias datatype in a database table 414, DBS 100 could execute blocks 1208–1214.

Figure 13:
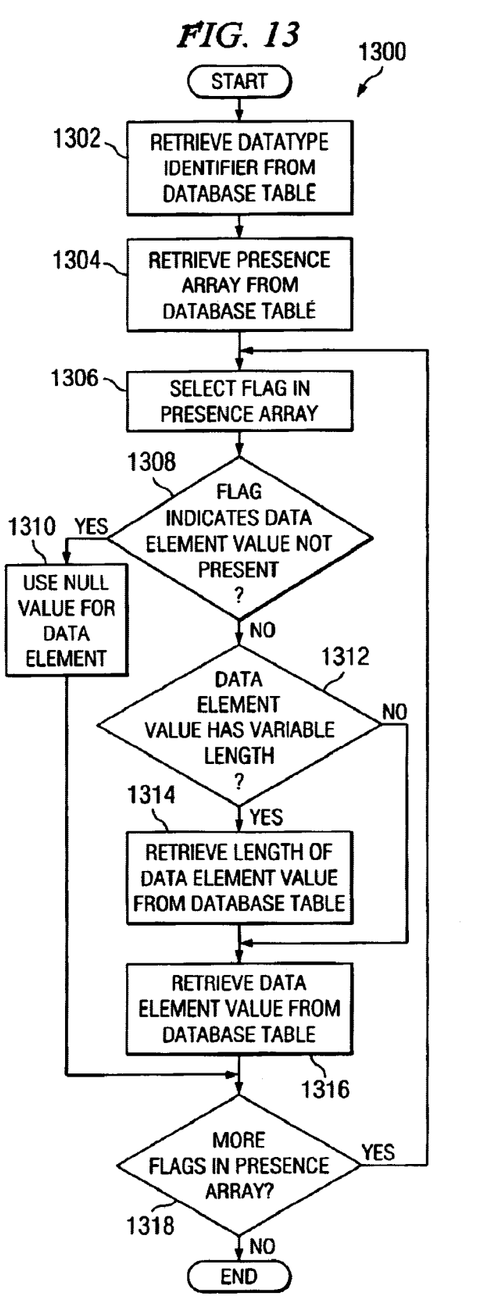
FIG. 13 is a flowchart of a method for retrieving an instance of a user-defined datatype from a database table.

FIG. 13 is a flowchart of a method 1300 for retrieving an instance of a user-defined datatype from a database table. In particular, method 1300 retrieves values for a container datatype instance 408*a* from a database table 414. While method 1300 may be described with respect to parsing engine 130 of DBS 100 of FIG. 1, method 1300 could be used by other components of DBS 100 or in other systems.

DBS 100 retrieves a datatype identifier from a database table at block 1302. This may include, for example, DBS 100 retrieving a type identifier 602 from a column 416 in a row 418 of table 414. DBS 100 retrieves a presence bit array from the database table at block 1304. This may include, for example, retrieving the presence bit array 610 from the same column 416 of the row 418 in table 414.

DBS 100 selects the first flag in the presence bit array at block 1306. This may include, for example, DBS 100 selecting the first bit in presence bit array 610. DBS 100 determines whether the selected flag indicates that a data element corresponding to the flag is empty at block 1308. This may include, for example, determining whether the selected flag has a value of zero. If so, DBS 100 assigns a null value to the pointer 606 in instance 408a that is associated with the flag at block 130. DBS 100 also skips to block 1318 to determine whether there are additional data elements 410 to be retrieved from the database table 414.

Otherwise, the flag indicates that the data element is not empty. DBS 100 determines whether a value of the data element 410 corresponding to the selected flag has a variable length at block 1312. If so, DBS 100 retrieves the length of the value associated with the data element 410 from the database table at block 1314. This may include, for example, DBS 100 retrieving a length 622 from the column 416 containing the previously retrieved type identifier 602 and presence bit array 610. DBS 100 retrieves the value associated with the data element 410 at block 1316. This may include, for example, retrieving a field value 620 from the column 416 containing the previously retrieved type identifier 602 and presence bit array 610. DBS 100 then determines whether additional data elements 410 remain to be retrieved from the instance. This may include, for example, DBS 100 determining if all flags in the presence bit array 610 have been examined. If additional data elements remain to be processed, DBS 100 returns to block 1306 to process the next data element 410.

Although FIG. 13 illustrates one example of a method 1300 for retrieving an instance of a user-defined datatype from a database table, various changes may be made to FIG. 13. For example, to retrieve an instance of an alias datatype from a database table 414, DBS 100 could execute blocks 1312–1316.

The text above described one or more specific embodiments of a broader invention. The invention also is carried out in a variety of alternative embodiments and thus is not limited to those described here. For example, while the invention has been described here in terms of a DBMS that uses a massively parallel processing ("MPP") architecture, other types of database systems, including those that use a symmetric multiprocessing ("SMP") architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method, comprising:
receiving a request associated with a user-defined datatype, wherein the user-defined datatype is associated with a plurality of data elements,
creating an instance of the user-defined datatype; and
storing the instance of the user-defined datatype in one column of a row in a database table, the column including at least one value associated with at least one of the plurality of data elements,
wherein the instance comprises:
an identifier operable to uniquely identify the user-defined datatype;
a count operable to identify a number of data elements associated with the user-defined datatype;
a plurality of type identifiers each operable to identify a type associated with one of the plurality of data elements;
a plurality of pointers each operable to identify a value associated with one of the plurality of data elements; and
a plurality of flags each operable to identify whether the pointer associated with one of the plurality of data elements has a null value.

2. A computer implemented method, comprising:
receiving a request associated with a user-defined datatype, wherein the user-defined datatype comprises a first datatype associated with a plurality of data elements,
creating an instance of the first datatype;
storing the instance of the first datatype in one column of a row in a database table, the column including at least one value associated with at least one of the plurality of data elements;
receiving a second request to generate a cast function involving the first datatype and a second datatype;
identifying a source datatype and a destination datatype using the second request, the source datatype comprising one of the first and second datatypes, the destination datatype comprising another of the first and second datatypes;
identifying a routine using the second request, the routine defining a mapping between data elements in the source datatype and data elements in the destination datatype; and
executing the routine.

3. A computer implemented method, comprising:
receiving a request associated with a user-defined datatype, wherein the user-defined datatype is associated with a plurality of data elements,
creating an instance of the user-defined datatype;
storing the instance of the user-defined datatype in one column of a row in a database table, the column including at least one value associated with at least one of the plurality of data elements;
receiving a second request to retrieve a first value associated with one of the plurality of data elements;
determining whether the data element has been assigned the first value;
returning a null pointer when the data element has not been assigned a first value;
returning a first pointer to the first value when the data element has been assigned the first value;
determining whether the first value has a variable length; and
returning a second pointer to a second value identifying the length of the first value when the first value has a variable length.

4. A computer implemented method, comprising:
receiving a request associated with a user-defined datatype, wherein the user-defined datatype is associated with a plurality of data elements,
creating an instance of the user-defined datatype;

storing the instance of the user-defined datatype in one column of a row in a database table, the column including at least one value associated with at least one of the plurality of data elements;
receiving a second request to assign a value to one of the plurality of data elements;
setting a pointer associated with the data element to identify the value;
determining whether a flag associated with the data element indicates that the data element is associated with a null pointer; and
when the flag indicates that the data element is associated with a null pointer, changing the flag to indicate that the data element is no longer associated with the null pointer.

5. A computer implemented method, comprising:
receiving a request associated with a user-defined datatype, the user-defined datatype including at least one data element;
creating an instance of the user-defined datatype, wherein at least one data element in the instance is associated with a value and each data element in the instance is associated with one of a null pointer and a non-null pointer identifying a value; and
storing the instance of the user-defined datatype in one column of a row in a database table, the column including at least one value associated with the at least one data element,
wherein:
storing the instance in the column comprises serially storing the value associated with the at least one data element in the column, and
serially storing the value associated with the at least one data element comprises serially storing any value associated with a non-null pointer in the column.

6. A computer implemented method, comprising:
receiving a request associated with a user-defined datatype, wherein the request comprises a list of one or more attributes and the user-defined datatype includes at least one data element;
creating a first instance of the user-defined datatype;
storing the first instance of the user-defined datatype in one column of a row in a database table, the column including at least one value associated with the at least one data element;
determining whether a second instance of the user-defined datatype appears in a cache; and
creating a constructor function and creating the second instance of the user-defined datatype using the constructor function when the second instance does not appear in the cache and storing the second instance in the cache,
wherein:
creating the first instance of the user-defined datatype comprises duplicating the second instance to create the first instance of the user-defined datatype; and
creating the constructor function comprises:
creating an array identifying one or more data elements corresponding to the one or more attributes;
creating programming code defining a class, the class comprising the identified one or more data elements;
compiling the programming code;
transforming the compiled programming code into a dynamic link library; and
linking database software to the dynamic link library, the database software operable to create the first and second instances.

7. A system, comprising:
a memory operable to store a database table; and
one or more processors collectively operable to:
receive a request associated with a user-defined datatype, wherein the user-defined datatype comprises a first datatype associated with a plurality of data elements;
create an instance of the first datatype;
store the instance of the first datatype in one column of a row in the database table, the column including at least one value associated with at least one of the plurality of data elements;
receive a second request to generate a cast function involving the first datatype and a second datatype;
identify a source datatype and a destination datatype using the second request, the source datatype comprising one of the first and second datatypes, the destination datatype comprising another of the first and second datatypes;
identify a routine using the second request, the routine defining a mapping between data elements in the source datatype and data elements in the destination datatype; and
execute the routine.

8. A system, comprising:
a memory operable to store a database table; and
one or more processors collectively operable to:
receive a request associated with a user-defined datatype, wherein the user-defined datatype is associated with a plurality of data elements;
create an instance of the user-defined datatype;
store the instance of the user-defined datatype in one column of a row in the database table, the column including at least one value associated with at least one of the plurality of data elements;
receive a second request to retrieve a first value associated with one of the plurality of data elements;
determine whether the data element has been assigned the first value;
return a null pointer when the data element has not been assigned a first value;
return a first pointer to the first value when the data element has been assigned the first value;
determine whether the first value has a variable length; and
return a second pointer to a second value identifying the length of the first value when the first value has a variable length.

9. A system, comprising:
a memory operable to store a database table; and
one or more processors collectively operable to:
receive a request associated with a user-defined datatype, wherein the user-defined datatype is associated with a plurality of data elements;
create an instance of the user-defined datatype;
store the instance of the user-defined datatype in one column of a row in the database table, the column including at least one value associated with at least one of the plurality of data elements;
receive a second request to assign a value to one of the plurality of data elements;
set a pointer associated with the data element to identify the value;

determine whether a flag associated with the data element indicates that the data element is associated with a null pointer; and when the flag indicates that the data element is associated with a null pointer, change the flag to indicate that the data element is no longer associated with the null pointer.

10. A system, comprising:

a memory operable to store a database table; and one or more processors collectively operable to:

receive a request associated with a user-defined datatype, the user-defined datatype including at least one data element;

create an instance of the user-defined datatype, wherein at least one data element in the instance is associated with a value and each data element in the instance is associated with one of a null pointer and a non-null pointer identifying a value;

store the instance of the user-defined datatype in one column of a row in the database table, the column including at least one value associated with the at least one data element;

store the instance in the column by serially storing the value associated with the at least one data element in the column; and serially store any value associated with a non-null pointer in the column.

11. A computer implemented method, comprising:

receiving a request to create an instance of a user-defined datatype, the user-defined datatype including at least one data element;

determining whether a base instance of the user-defined datatype appears in a cache;

creating the base instance of the user-defined datatype, and storing the base instance in the cache, when the base instance does not appear in the cache; and creating the requested instance of the user-defined datatype by duplicating the base instance, wherein the base instance and the requested instance each comprise:

an identifier operable to uniquely identify the user-defined datatype;

a count operable to identify a number of data elements associated with the user-defined datatype;

one or more type identifiers each operable to identify a type associated with a data element;

one or more pointers each operable to identify a value associated with a data element; and one or more flags each operable to identify whether a pointer associated with a data element has a null value.

12. The computer implemented method of claim 11, further comprising creating a constructor function, wherein creating the base instance of the user-defined datatype comprises creating the base instance of the user-defined datatype using the constructor function.

13. The computer implemented method of claim 12, wherein:

the request comprises a list identifying one or more attributes; and creating the constructor function comprises:

creating an array identifying one or more data elements corresponding to the one or more attributes;

creating programming code defining a class, the class comprising the identified one or more data elements;

compiling the programming code;

transforming the compiled programming code into a dynamic link library; and linking database software to the dynamic link library, the database software operable to create instances of the user-defined datatype.

14. The computer implemented method of claim 11, further comprising making the cache available for use in storing other information if the base instance has not been used for a predetermined period of time.

15. The computer implemented method of claim 14, wherein making the cache available for use in storing other information comprises aging the base instance.

16. The computer implemented method of claim 11, wherein the at least one data element comprises a data element identifier, a pointer and a length parameter.

17. The computer implemented method of claim 16, wherein the data element identifier identifies a datatype associated with the data element.

18. The computer implemented method of claim 16, wherein the pointer comprises one of a null pointer indicating no value is associated with the data element, and a non-null pointer indicating location of the value when a value is associated with the data element.

19. The computer implemented method of claim 16, wherein the length parameter comprises a length of a value associated with the data element.

20. The computer implemented method of claim 11, wherein the base instance comprises a plurality of data elements.

21. The computer implemented method of claim 20, further comprising assigning a value to at least one of the plurality of data elements of the requested instance.

22. The computer implemented method of claim 21, further comprising storing the requested instance in one column of a row in a database table.

23. The computer implemented method of claim 22, wherein storing the requested instance comprises serially storing each assigned value without storing a null value for any of the plurality of data elements for which a value has not been assigned.

24. The computer implemented method of claim 23, wherein the requested instance further comprises a presence array indicating which of the plurality of data elements has been assigned a value.

25. The computer implemented method of claim 24, further comprising retrieving a value of a data element from the column of the row of the database table.

26. The computer implemented method of claim 25, wherein retrieving the data element values comprises returning a pointer to the value when the presence array indicates the data element has been assigned a value, and returning a null pointer when the presence array indicates the data element has not been assigned a value.

27. The computer implemented method of claim 21, wherein the value assigned to the at least one of the plurality of data elements comprises a first value having a variable length, and a second value operable to identify the length of the first value.

28. The computer implemented method of claim 21, wherein the user-defined datatype comprises a first datatype, and the value assigned to the at least one of the plurality of data elements of the requested instance of the first datatype comprises at least one first value, further comprising:

assigning a value to at least a second of the plurality of data elements of the requested instance of the first datatype identifying an instance of a second datatype; and serially storing the at least one first value and one or more values associated with the identified instance of the second datatype in one column of a row in a database table.

* * * * *